United States Patent [19]

Golovin et al.

[11] Patent Number: 5,733,677
[45] Date of Patent: Mar. 31, 1998

[54] METAL-AIR ELECTROCHEMICAL CELL WITH OXYGEN RESERVOIR

[75] Inventors: Milton Neal Golovin, Marietta, Ga.; Thomas Alan Reynolds; Daniel John Brose, both of Bend, Oreg.

[73] Assignee: AER Energy Resources, Inc., Smyrna, Ga.

[21] Appl. No.: 858,365

[22] Filed: May 19, 1997

[51] Int. Cl.[6] .................................................. H01M 12/06
[52] U.S. Cl. ...................................... 429/27; 429/38
[58] Field of Search .......................... 429/27, 34, 38, 429/39, 12

[56] References Cited

U.S. PATENT DOCUMENTS

| | | | |
|---|---|---|---|
| 3,576,677 | 4/1971 | Keating, Jr. et al. | 136/86 |
| 3,977,901 | 8/1976 | Buzzelli | 136/86 |
| 4,207,382 | 6/1980 | Zaromb | 429/19 |
| 4,262,062 | 4/1981 | Zatsky | 429/27 |
| 4,380,576 | 4/1983 | Yoshida et al. | 429/27 |
| 4,613,551 | 9/1986 | Doddapaneni | 429/194 |
| 4,698,283 | 10/1987 | Doddapaneni | 429/101 |
| 4,729,930 | 3/1988 | Beal et al. | 429/13 |
| 4,900,642 | 2/1990 | Tomantschger et al. | 429/59 |
| 4,957,826 | 9/1990 | Cheiky | 429/27 |
| 5,043,234 | 8/1991 | Tomantschger et al. | 429/59 |
| 5,145,752 | 9/1992 | Goldstein et al. | 429/27 |
| 5,306,579 | 4/1994 | Shepard, Jr. et al. | 429/40 |
| 5,328,777 | 7/1994 | Bentz et al. | 429/27 |
| 5,346,780 | 9/1994 | Suzuki | 429/42 |
| 5,451,473 | 9/1995 | Oltman et al. | 429/27 |
| 5,506,067 | 4/1996 | Tinker | 429/27 |
| 5,527,632 | 6/1996 | Gardner | 429/27 |
| 5,569,551 | 10/1996 | Pedicini et al. | 429/27 |
| 5,652,068 | 7/1997 | Shuster | 429/27 |
| 5,665,481 | 9/1997 | Shuster | 429/27 |

*Primary Examiner*—Anthony Skapars
*Attorney, Agent, or Firm*—Jones & Askew

[57] ABSTRACT

A metal-air electrochemical cell comprising an oxygen reservoir disposed in an air plenum adjacent the air cathode. The oxygen reservoir includes an oxygen binding compound characterized in that the oxygen binding compound reversibly binds oxygen and releases oxygen into the air in the air plenum to power the cell when the partial pressure of oxygen in the air plenum drops due to a load on the cell.

19 Claims, 2 Drawing Sheets

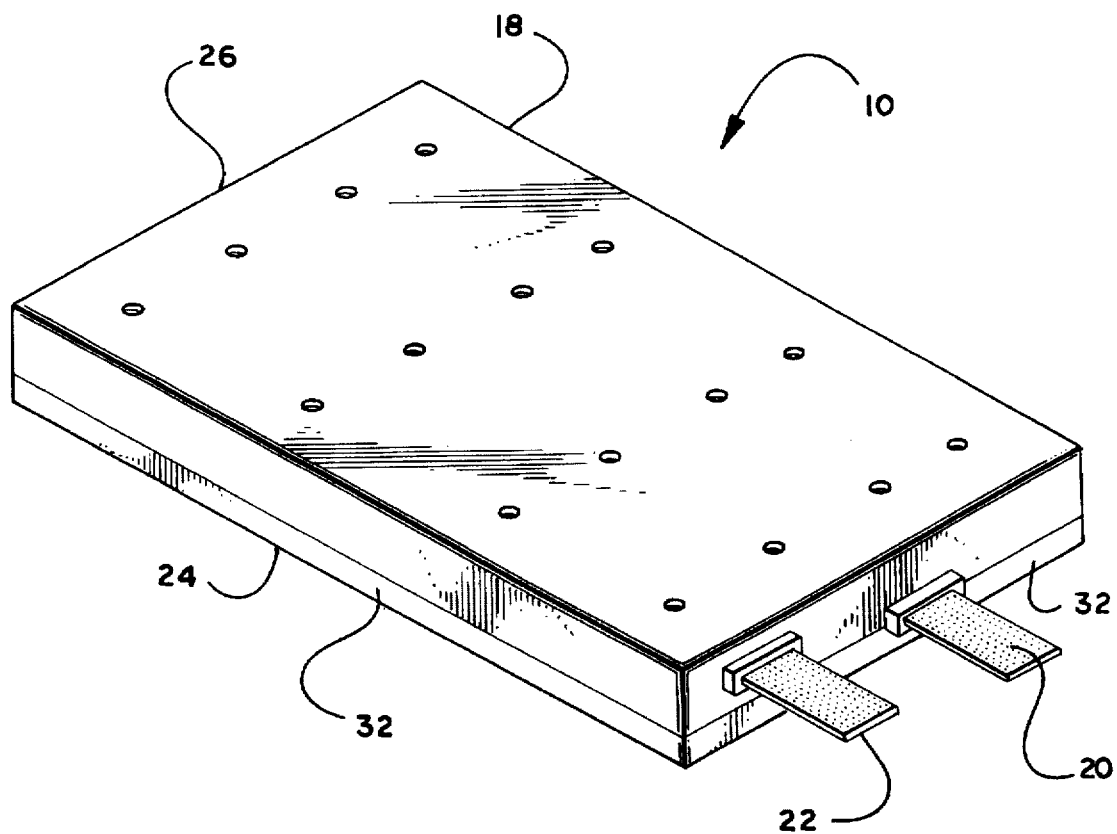
Fig_1

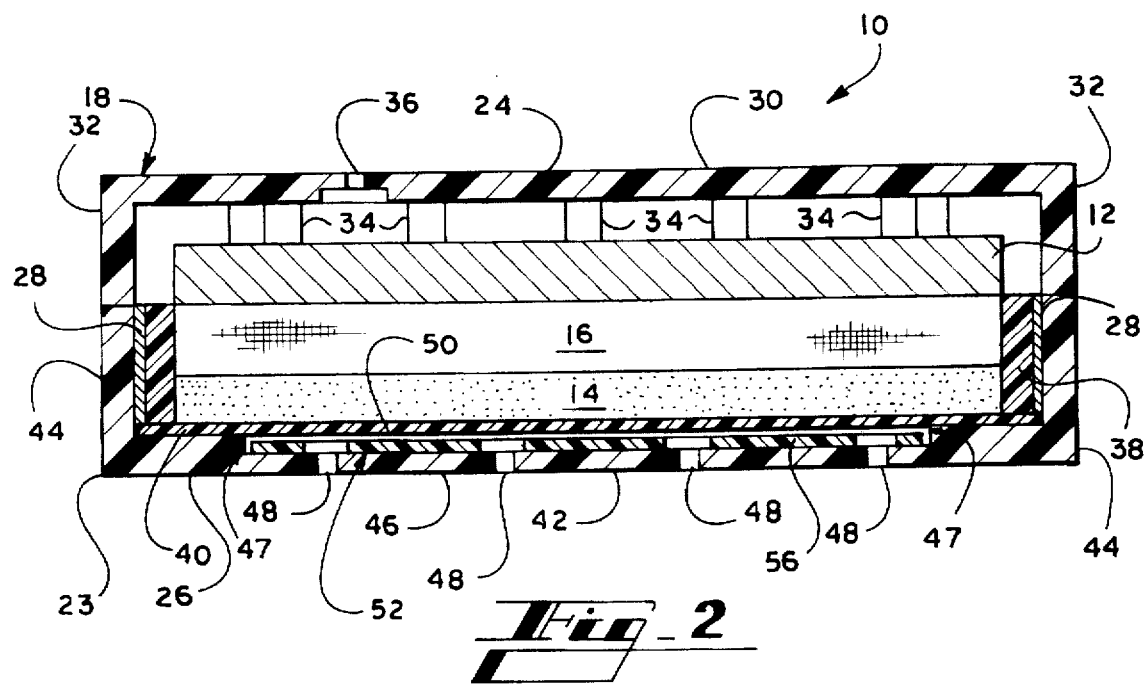
Fig_2
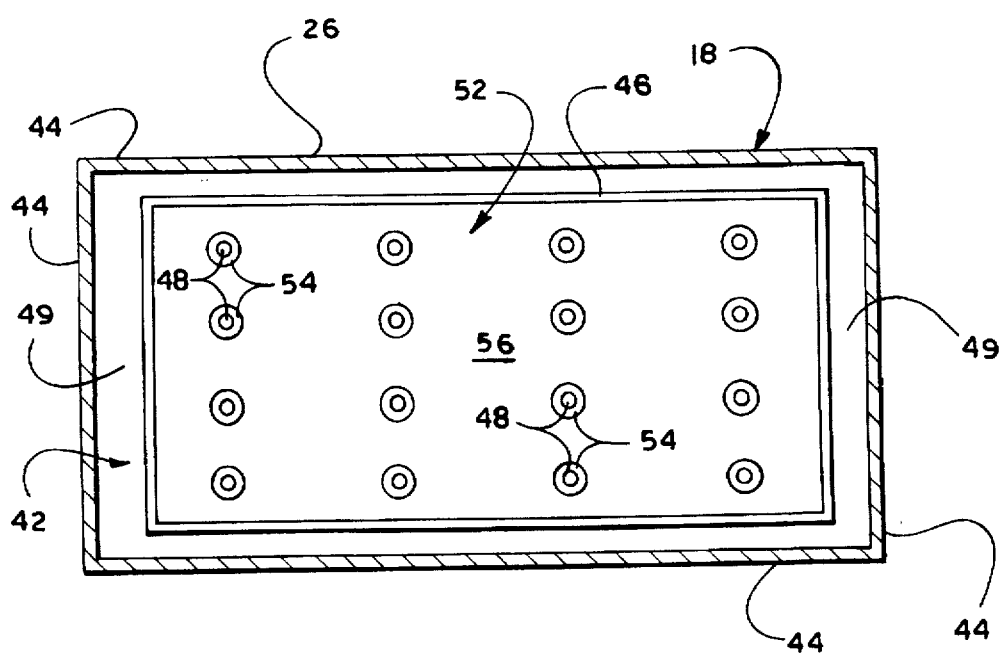
Fig_3

METAL-AIR ELECTROCHEMICAL CELL WITH OXYGEN RESERVOIR

TECHNICAL FIELD

This invention relates to metal-air electrochemical cells, and more particularly to metal-air electrochemical cells with an air management system.

BACKGROUND OF THE INVENTION

Metal-air electrochemical cells utilize oxygen from ambient air as a reactant in an electrochemical reaction to provide a relatively lightweight power supply. Generally described, a metal-air cell includes an air-permeable cathode and a metallic anode separated by an aqueous electrolyte. During operation of a zinc-air cell, for example, oxygen from the ambient air is converted at the cathode to hydroxide ions, zinc is oxidized at the anode and reacts with hydroxide ions, and water and electrons are released to provide electrical energy.

Cells that are useful for only a single discharge cycle are called primary cells, and cells that are rechargeable and useful for multiple discharge cycles are called secondary cells. An electrically rechargeable metal-air cell is recharged by applying voltage between the anode and the cathode of the cell and reversing the electrochemical reaction. During recharging, the cell discharges oxygen to the atmosphere through the air-permeable cathode and the anode is electrolytically reformed by reducing to the base metal, the metal oxides formed during discharge.

One problem with metal-air cells is that the difference between the ambient relative humidity and the internal relative humidity of the cell can cause the metal-air cell to fail. If ambient humidity is greater than the equilibrium relative humidity value for the metal-air cell, the metal-air cell will absorb water from the air through the cathode and fail due to a condition called flooding. Flooding may cause the cell to leak. If the ambient humidity is less than the equilibrium relative humidity value for the metal-air cell, the cell will release water vapor from the electrolyte through the air cathode and fail due to drying out. In most environments where a metal-air battery cell is used, failure occurs from drying out.

Drying out and flooding are greater problems for secondary (rechargeable) metal-air cells than for primary metal-air cells. Although ambient humidity may not be a sufficient problem to flood or dry out a cell after a single cycle, cumulative water gain or loss from a series of discharge and charge cycles can cause premature failure of a secondary metal-air cell. Another problem with metal-air cells is that contaminates in the air such as carbon dioxide, smoke, and sulfides, decrease the battery output.

Thus, it has been desirable to control the exposure of the air cathode in a metal-air cell to air so that the amount of air to which the cathode is exposed is sufficient to generate the power demands of the cell but insufficient to cause premature failure of the cell through flooding, drying out, or the accumulation of contaminants. To control the exposure of the air cathode in a metal-air cell to air, cell case structures and air management systems have been developed to limit the air exposure of the air cathode to air.

One cell case structure for controlling the air to which an air cathode is exposed is disclosed in U.S. Pat. No. 5,328,777 which teaches the use of a perforated mask covering an air cathode of a metal-air cell and forming an air plenum adjacent the air cathode. The openings in the mask are sized and distributed across the mask so as to allow a sufficient amount of air to the air cathode for an adequate production of power from the cell, but limit the amount of air to which the air cathode is exposed so as to prevent premature failure of the cell from flooding, drying out, or contamination. Such a cell case structure system is effective, but can cause problems when the cell is under a period of heavy load. For example, when powering a laptop computer, high power is necessary during start up of the computer. The high drain on the metal-air cell powering the computer can deplete oxygen in the air plenum adjacent the air cathode faster than the oxygen can be replaced by the flow of air or diffusion of oxygen through the mask. This reduction in oxygen reduces the partial pressure of oxygen in the air plenum and can cause the voltage of the cell to drop, and therefore the power delivered by the cells to drop. This power capability loss is not attributable to any performance capability of the cell chemistry, but rather, is attributable to the accessibility, or lack of accessibility, of the cell to sufficient quantities of oxygen during periods of high load.

Accordingly, there is a need for a metal-air cell with an air management structure or system which limits exposure of the cell to air, and therefore oxygen, but provides enhanced levels of oxygen to the air plenum adjacent the cathode during times of heavy load on the metal-air cell.

SUMMARY OF THE INVENTION

This invention solves the above-described problems in the art by providing a metal-air electrochemical cell including an oxygen reservoir disposed in the air plenum adjacent the air cathode for providing oxygen to enrich the air in the air plenum with oxygen for enhanced performance of the cell and to power the cell when the partial pressure of oxygen in the air plenum drops due to a load on the cell. The oxygen reservoir includes an oxygen binding compound characterized in that the oxygen binding compound reversibly binds oxygen and releases oxygen into the air in the air plenum adjacent the air cathode to power the cell when high oxygen concentrations are needed or the partial pressure of oxygen in the air plenum drops. Accordingly, although the exposure of the air cathode to air may be minimized to satisfy normal oxygen requirements for the cell, enhanced levels of oxygen can be automatically provided to the air cathode during periods of high load on the cell.

More particularly, the metal-air electrochemical cell of the present invention comprises a case having a cathode opening for receiving and releasing gas from the case, an air cathode disposed in the case adjacent the cathode opening, an anode disposed in the case, a liquid electrolyte disposed in the case and contacting the air cathode and the anode, a housing defining an air plenum adjacent the cathode opening for supplying air to the air cathode, the air in the air plenum having a partial pressure of oxygen, and an oxygen reservoir disposed in the air plenum. The oxygen reservoir comprises an oxygen binding compound which reversibly binds oxygen and releases oxygen into the air in the air plenum to power the cell when high oxygen concentrations are needed or when the partial pressure of oxygen in the air plenum drops due to a load on the cell.

Desirably, the cell is rechargeable and has two modes of operation. One mode is the discharge mode in which oxygen from the air plenum is consumed at the air cathode and electricity is produced. Another mode is the recharge mode in which oxygen is produced at the air cathode and released into the air plenum and electrical energy is stored. The oxygen binding compound binds oxygen from the air plenum during the recharge mode and releases oxygen into the air plenum during heavy load periods experienced while discharging.

Suitable oxygen binding compounds are transition metal complexes. In particular, suitable oxygen binding compounds include first row transition metal complexes, such as metal or cobalt complexes, and other materials that bind oxygen in their structure.

A particularly suitable transition metal complex is a transition metal macrocyclic compound. Desirable macrocyclic compounds include cobalt porphyrin and iron phthalocyanine. An example of a suitable transition metal macrocyclic compound is 5, 10, 15, 20-tetrakis(4-methoxyphenyl)-21 H, 23 H-porphine cobalt (II).

Another suitable oxygen binding compound is a Schiff base complex such as N,N'-bis(salicylidene) ethylenediaminocobalt (II).

More particularly, the oxygen reservoir can further comprise an oxygen permeable substrate which is impregnated with the oxygen binding compound. Suitable substrates include porous polymeric nonwoven webs, oxygen permeable polymers such as silicone rubber film, and porous ceramic matrices.

Accordingly, an object of the present invention is to provide an improved metal-air electrochemical cell.

Another object of the present invention is to provide an improved rechargeable metal-air cell.

Still another object of the present invention is to provide a rechargeable metal-air cell which minimizes exposure of the air cathode to air, but also provides sufficient power output during periods of heavy load on the cell.

Other objects, features, and advantages of the present invention will become apparent from the following detailed description, drawings, and claims.

BRIEF DESCRIPTION OF DRAWINGS

FIG. 1 is a perspective view of a metal-air cell made in accordance with an embodiment of the present invention.

FIG. 2 is a partial, cross-sectional, elevation view of the metal-air cell shown in FIG. 1.

FIG. 3 is a plan view of a portion of the case of the metal-air cell shown in FIG. 1 illustrating an oxygen reservoir.

DETAILED DESCRIPTION OF DRAWINGS

As summarized above, the present invention encompasses a metal-air electrochemical cell comprising an oxygen reservoir disposed in a cathode air plenum of the cell for providing a supplemental source of oxygen to the air cathode when the cell is powering a heavy load. An embodiment of this invention is described in detail below.

A metal-air cell 10 is shown in FIGS. 1 and 2 and generally comprises an anode 12, an air cathode 14, a separator 16, and an electrolyte disposed in a cell case 18. In FIG. 1, the cell 10 is oriented so that the cathode 14 is above the anode 12. In FIG. 2, the cell 10 is inverted so that the anode 12 is above the cathode 14. During normal operation, the cell is desirably oriented so that the anode 12 is above the cathode 14.

The anode 12 can be any anode suitable for use in a metal-air electrochemical cell. Generally described, the anode 12 comprises an anodic material bonded to a metal current collector. A suitable anode is disclosed in U.S. Pat. No. 5,506,067, the disclosure of which is expressly incorporated herein by reference.

Generally described, the anodic layer of the anode 12 is desirably a sheet of solid, non-particulate metal that oxidizes under conditions of operation of an electrochemical cell to produce electrical energy. Suitable metals include zinc, aluminum, magnesium, lithium, iron, cadmium, and lead. The current collector includes a metal which is capable of conducting electricity produced during discharge of the cell, but not being oxidized during discharge of the cell. Suitable metals for the current collector are non-corrosive metals such as copper, nickel, tin, titanium, or silver. The current collector is desirably a silver foil. As shown in FIG. 1, the current collector of the anode 12 has a lead 20 which extends from the cell case 18 for electrical connection to a load.

The cathode 14 can be a cathode suitable for use in a metal-air electrochemical cell, but is desirably a porous sheet-type cathode including an active layer directly adhered to a gas-permeable, liquid-impermeable, wet proofing layer, as disclosed in U.S. Pat. Nos. 3,977,901, 5,306,579, and 5,506,067, the disclosures of which are expressly incorporated herein by reference. Generally described, however, the active layer of the cathode 14 forms the electrolyte side of the cathode, faces the electrolyte, and comprises catalyzed particles of activated carbon and particles of a hydrophobic polymer such as polytetrafluoroethylene. The wet proofing layer forms the air side of the cathode 14 and includes a mixture of carbon black particles and polytetrafluoroethylene particles. The cathode 14 further includes a metal current collector which has a lead 22 extending therefrom for connection to a positive terminal for the cell 10. Suitable current collectors include fine mesh metal screens and expanded, perforated metal sheets made of non-corrosive metal such as nickel, tin or titanium.

A suitable electrolyte is an aqueous electrolyte including a Group I metal hydroxide such as LiOH, NaOH, KOH, CsOH, or the like.

The separator 16 disposed in the cell case 18 between the anode 12 and the cathode 14 separates the anode and cathode of the cell so that the electrodes do not come in direct electrical contact with one another and short circuit the cell. The separator 16 also absorbs and wicks electrolyte to keep electrolyte in contact with the electrodes. A suitable separator system is disclosed in U.S. Pat. No. 5,506,067, already incorporated by reference. Generally described, the separator 16 includes a plurality of layers of wettable and oxidation-resistant material such as nonwoven polymeric webs. The separator 16 allows the flow of electrolyte but at least one layer of the separator retains the metallic ions and compounds from the anode 12 at the anode and separate from the other components of the metal-air cell. The cell case 18 comprises a rectangular, boxed-shaped or prismatic shell 23. The shell 23 comprises a substantially rectangular first member 24 and a substantially rectangular second member 26, both having the shape of a tray. The first member 24 is heat welded to the second member 26 along a single seam 28 to form the prismatic shape. The anode 12 is disposed proximate the first member 24 and the cathode 14 is disposed proximate the second member 26. Desirably, the case 18 is made of a material, such as polypropylene, that is lightweight and does not corrode when exposed to the electrolyte.

The first member 24 of the case shell 23 comprises a planar, rectangular anode panel 30 and four side walls 32 extending perpendicularly from the anode panel along the edges of the anode panel. As best shown in FIG. 2, the first member 24 of the case shell 23 further includes a plurality of spacers 34 integral with and extending inwardly from the first member 24 of the case 18 about the periphery of the anode panel 30. The spacers 34 are spaced from one another and space the anode 12 of the cell 10 from the first member 24.

The anode panel 30 of the first member 24 has one or more gas vents 36 for releasing gas from the cell case 18. A suitable vent 36 is disclosed in U.S. Pat. No. 5,362,577, which is expressly incorporated herein by reference.

A rectangular support 38 fits about the interior of the cell case 18. The separator 16 and the cathode 14 extend within the rectangular support 38. A gas-permeable, liquid-impermeable membrane 40 fits tightly between the cell case 18 and the rectangular support 38. The membrane 40 extends across the air side of the cathode 14 and allows passage of air to and from the cathode, but seals electrolyte within the cell case 18. A suitable material for the membrane 40 is Celgard 2400 microporous polypropylene membrane available from Hoechst Celanese Corporation of Charlotte, N.C.

As best shown in FIG. 3, the second member 26 of the case shell 23 comprises a rectangular cathode panel 42 and four side walls 44 extending perpendicularly from edges of the cathode panel. The cathode panel 42 includes a mask member 46 which extends over and is spaced from the air cathode 14. The second member 26 of the case 18 has a peripheral shoulder 49 surrounding the mask member 46 and defining an opening 50 for receiving and releasing gas from the cell case 18 through the cathode 14. The mask member 46 and the remainder of the second member 26 of the case 18 form a housing defining an air plenum 47 adjacent the cathode 14. The mask member 46 allows a sufficient amount of air to the cathode 14 through the opening 50 for adequate power production from the cell, but limits the exposure of the air cathode to air to minimize exposure of the air cathode to moisture and contaminates to prevent premature failure from flooding, drying out, or contamination. A suitable mask member is disclosed in U.S. Pat. No. 5,328,777, the disclosure of which is expressly incorporated herein by reference.

An oxygen reservoir 52 is disposed in the air plenum 47 and adhered to the inner surface of the mask member 46. The oxygen reservoir 52 is desirably spaced from the cathode membrane 40 and has a plurality of holes 54 aligned with the openings 48 in the mask member 46 for allowing air to enter and exit the air plenum 47. The oxygen reservoir 52 desirably includes a substrate 56 impregnated with an oxygen binding compound, but it should be understood that the oxygen binding compound can alternatively be self-supporting and disposed in the air plenum without a substrate, such as by depositing the oxygen binding compound directly against the interior of the cell case.

The oxygen binding compound in the oxygen reservoir 52 reversibly binds oxygen and forms an equilibrium with oxygen in the surrounding air. In the metal-air cell 10, the oxygen binding compound develops an equilibrium with the oxygen in the air plenum 47. When the demand for oxygen is high or when the partial pressure of oxygen in the air plenum 47 drops due to a load on the cell 10, the oxygen binding compound releases oxygen into the air in the air plenum to power the cell because of the change in equilibrium. Likewise, when the oxygen content of the air in the air plenum 47 increases, such as during recharge when oxygen is produced by the cell, the oxygen binding compound binds oxygen and becomes "charged" with oxygen. This bound oxygen can then be released when there is another heavy load on the cell and the partial pressure of oxygen in the air plenum drops. Alternatively, the oxygen bound to the reservoir can be driven off into the air plenum by applying heat to the reservoir or by another driving force sufficient to overcome the state of equilibrium between the oxygen in the reservoir and the oxygen in the air plenum.

Suitable oxygen binding compounds include transition metal complexes. In particular, first row transition metal complexes such as iron or cobalt complexes are desirable. For example, transition metal macrocyclic compounds such as cobalt porphyrin or iron phthalocyanine are suitable. A particularly suitable transition metal macrocyclic compound is 5,10,15,20-tetrakis (4-methoxyphenyl)-21 H,23 H-porphine cobalt(II).

Schiff base complexes are also suitable as oxygen binding compounds. A particularly suitable Schiff base complex is N,N' bis(salicylidene) ethylenediaminocobalt(II).

Suitable substrates are oxygen permeable and include porous nonwoven membranes and oxygen permeable polymers, such as silicone rubber membranes, impregnated with the oxygen binding compound. A suitable polymeric nonwoven material is Celgard 2500 microporous polypropylene membrane available from Hoechst Celanese Corporation of Charlotte, N.C. Desirably, the pores in the membrane are filled with the oxygen binding compound such as by dipping the membrane in a solution containing the oxygen binding compound dissolved therein and drying the dipped membrane. Suitable solvents include tetrahydrofuran, methyl alcohol, and acetone. The solution can also be applied by other means such as spraying or roll coating. Alternatively, the oxygen reservoir can be cast by incorporating the oxygen binding compound into an uncured monomer or prepolymer mixture and then casting the mixture into a film and curing the material to form the impregnated membrane.

The following examples are designed to disclose particular embodiments of the present invention and teach one of ordinary skill in the art to carry out the present invention.

EXAMPLE 1

An oxygen reservoir was prepared in the following manner. Cobalt tetraphenyl porphyrin (CoTPP, 0.1 g) and poly-trimethylsilylpropyne (PTMSP, 1.0 g) were co-dissolved in 100 ml of tetrahydrofuran (THF) at reflux under a flow of nitrogen gas. The reaction mixture was stirred for 5 hours and allowed to cool to room temperature. A portion of the solution was cast on a Celgard 2500 membrane under a nitrogen atmosphere and dried under a vacuum of 10 mmHg. The color of the resultant film was brown under a nitrogen atmosphere and on exposure to oxygen changed color to deep violet, due to adsorption of oxygen.

A sample prepared in Example 1 was tested for permeability to oxygen and nitrogen by passing dry air through the samples and measuring the concentrations of oxygen and nitrogen in both the feed stream and permeate stream. Standard gas chromatographic techniques were used to measure the concentrations of gases in the streams.

Samples (two inch circular disks) were placed in a permeation test cell, supported by a stainless steel screen. The cell was O-ring sealed and placed in a test apparatus at 35° C. Dry air at a fixed pressure, flow rate, and known composition of oxygen and nitrogen was flowed across the samples through ports on the feed side of the cell. The gases selectively permeated through the sample and were transported with a helium sweep stream to the gas chromatograph for analysis. The permeances of oxygen and nitrogen were calculated based on the concentrations of gases and pressures in both the feed and permeate streams. Selectivities of the gas pair are expressed as a ratio of the individual permeances. Results are shown in Table 1 wherein Permeance (P) has units of $cm^3 \, cm^{-2}s^{-1} \, cm \, Hg^{-1}$. The sample containing the oxygen carrier CoTPP demonstrated enhanced $O_2/N_2$ selectivity when compared to the sample without the CoTPP demonstrating that the sample acts as an oxygen reservoir.

TABLE 1

| SAMPLE | Feed Pressure | P(O$_2$) | P(N$_2$) | O$_2$/N$_2$ |
|---|---|---|---|---|
| PTMSP/CoTPP | 1.0 psig | $3.2 \times 10^{-5}$ | $1.3 \times 10^{-5}$ | 2.4 |
| PTMSP (no CoTPP) | 1.0 psig | $4.1 \times 10^{-5}$ | $2.7 \times 10.5$ | 1.5 |

EXAMPLE 2

Another oxygen reservoir is prepared in the following manner. A copolymer of poly[(hexyl methacrylate)-co-1vinylimidazole] is prepared by radical copolymerization of vinylimidazole and n-hexylmethacrylate (VI-HMA) using azobisisobutyronitrile as an initiator. The copolymer (10 wt. %) is dissolved in toluene. To this solution is added a solution containing an oxygen carrier, N,N'Bis(salicylidene) ethylenediaminocobalt(II), (CoSalen) (1.0 wt. % in tetrahydrofuran). The stirred solution is heated under a flow of nitrogen at 50° C. for 1 hour. A portion of the solution is cast on a Celgard 2500 membrane under a nitrogen atmosphere and dried under a vacuum of 10 mmHg. The color of the resultant film is brown under a nitrogen atmosphere and on exposure to oxygen changes color to deep violet, due to adsorption of oxygen.

Desirably, the metal-air electrochemical cell 10 is a rechargeable cell and has two modes of operation. The first mode is the discharge mode in which oxygen from the air plenum is consumed at the air cathode 14 and electricity is produced. The second mode is the recharge mode in which oxygen in produced at the cathode 14 and released into the air plenum 47 and electrical energy is stored. During times of heavy load in the discharge mode, oxygen content in the air plenum 47 is depleted thereby reducing the partial pressure of oxygen in the air plenum. Upon reduction of the partial pressure of oxygen in the air plenum 47, the oxygen binding compound in the oxygen reservoir 52 releases oxygen into the air plenum to power the cell 10 during the period of heavy load and oxygen depletion. When the cell 10 is in the recharge mode, the oxygen binding compound in the oxygen reservoir 52 attracts and stores oxygen which is then available during the next heavy load period.

Although the cell 10 described above has one cathode 14 and one anode 12, the oxygen reservoir can also be used in a dual electrode metal-air cell as is disclosed in U.S. Pat. No. 5,569,551, the disclosure of which is expressly incorporated herein in its entirety. The metal-air cell disclosed in U.S. Pat. No. 5,569,551 includes a pair of air cathodes disposed in a cell case, and an anode comprising a single current collector sandwiched between a pair of anodic plates, such as zinc plates, and disposed in the cell case between the two cathodes. The air cathodes are spaced from respective sides of the anode and are separated from the anode by separator packages like the separator 16 of the cell 10 described herein. The case includes a pair of masks, one adjacent each cathode, and each mask forms a cathode plenum adjacent the respective cathode. An oxygen reservoir, made as described above with regard to the cell 10, is disposed in each of the cathode plenums.

It should be understood that the foregoing relates to particular embodiments to the present invention, and that numerous changes may be made therein without departing from the scope of the invention as defined by the following claims.

We claim:

1. A metal-air electrochemical cell comprising:
   a case having a cathode opening for receiving and releasing gas from the case;
   an air cathode disposed in the case adjacent the cathode opening;
   an anode disposed in the case;
   a liquid electrolyte disposed in the case and contacting the air cathode and the anode;
   a housing defining an air plenum adjacent the cathode opening for supplying air to the air cathode, the air in the plenum having a partial pressure of oxygen; and
   an oxygen reservoir disposed in the air plenum comprising an oxygen binding compound characterized in that the oxygen binding compound reversibly binds oxygen.

2. A metal-air cell as in claim 1 wherein the cell is rechargeable and has two modes of operation, a discharge mode, in which oxygen from the air plenum is consumed at the air cathode and electricity is produced, and a recharge mode, in which oxygen is produced at the air cathode and released into the air plenum and electrical energy is stored, the oxygen binding compound being further characterized in that the oxygen binding compound binds oxygen from the air plenum during the recharge mode and releases oxygen into the air plenum during discharge.

3. A metal-air cell as in claim 1 wherein the oxygen binding compound is further characterized in that the oxygen binding compound releases oxygen into the air in the air plenum to power the cell when the partial pressure of oxygen in the air plenum drops due to a load on the cell.

4. A metal-air cell as in claim 1 wherein the oxygen binding compound is a transition metal complex.

5. A metal-air cell as in claim 1 wherein the oxygen binding compound comprises a first row transition metal.

6. A metal-air cell as in claim 1 wherein the oxygen binding compound comprises an iron or cobalt complex.

7. A metal-air cell as in claim 1 wherein the oxygen binding compound comprises a transition metal macrocyclic compound.

8. A metal-air cell as in claim 7 wherein the transition metal macrocyclic compound is a cobalt porphyrin or an iron phthalocyanine.

9. A metal-air cell as in claim 7 wherein the transition metal macrocyclic compound is 5, 10, 15, 20-tetrakis (4-methoxyphenyl)-21 H, 23H-porphine cobalt II).

10. A metal-air cell as in claim 1 wherein the oxygen binding compound comprises a Schiff base complex.

11. A metal-air cell as in claim 10 wherein the Schiff base complex is N,N'-bis(salicylidene) ethylenediaminocobalt (II).

12. A metal-air cell as in claim 1 wherein the oxygen reservoir further comprises an oxygen permeable substrate and the oxygen permeable substrate is impregnated with the oxygen binding compound.

13. A metal-air cell as in claim 12 wherein the substrate is a porous polymeric nonwoven web.

14. A metal-air cell as in claim 12 wherein the substrate is an oxygen permeable polymer.

15. A metal-air cell as in claim 12 wherein the substrate is a silicone rubber film.

16. A metal-air cell as in claim 1 wherein the housing comprises a mask attached to the case, the mask having a central portion spaced from and covering the air cathode to form at least a portion of the air plenum, the central portion of the mask having an opening for receiving gas into and releasing gas from the air plenum and having an interior facing the air cathode, the oxygen binding compound being mounted on the interior of the central portion.

17. A metal-air cell as in claim 16 wherein the oxygen reservoir further comprises an oxygen permeable substrate, the oxygen permeable substrate is impregnated with the oxygen binding compound, the oxygen reservoir is attached to the interior of the central portion of the mask, and the oxygen reservoir has an opening aligned with the opening in the mask.

18. A metal-air cell as in claim 16 wherein the mask has a plurality of openings for receiving gas into and releasing gas from the air plenum, the oxygen reservoir further comprises an oxygen permeable substrate, the oxygen permeable substrate is impregnated with the oxygen binding compound, the oxygen reservoir is attached to the interior of the central portion of the mask, and the oxygen reservoir has a plurality of openings aligned with the openings in the mask.

19. A metal-air cell as in claim 1 wherein the oxygen binding compound is structurally self-supporting within the air plenum.

* * * * *